Figure 3:
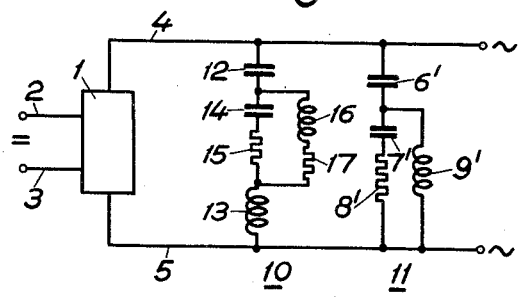

June 5, 1962  H. FORSSELL  3,038,134
MEANS FOR REDUCING THE HARMONIC CURRENTS IN
A STATIC CONVERTER PLANT
Filed Jan. 13, 1959  2 Sheets-Sheet 1
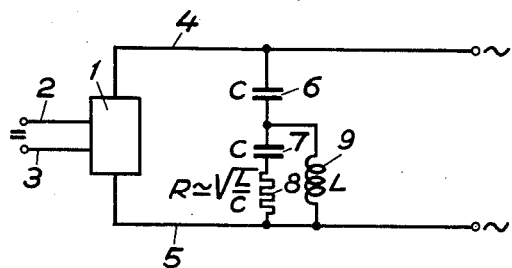
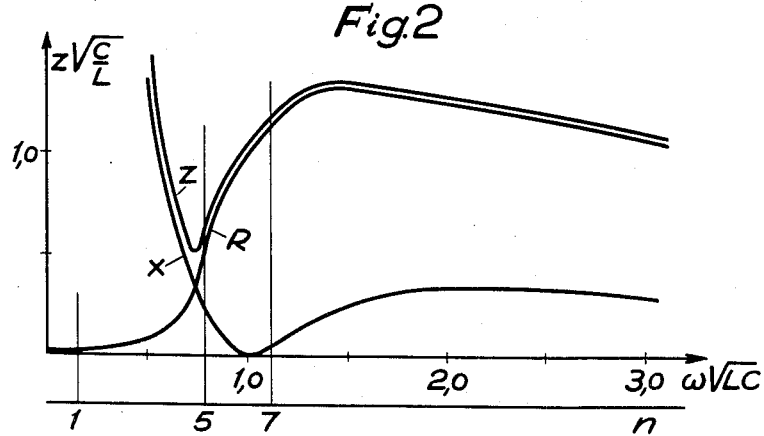
INVENTOR.
Harry Forssell June 5, 1962  H. FORSSELL  3,038,134
MEANS FOR REDUCING THE HARMONIC CURRENTS IN
A STATIC CONVERTER PLANT
Filed Jan. 13, 1959  2 Sheets-Sheet 2

INVENTOR.
Harry Forssell.
BY
Attorney

United States Patent Office 3,038,134
Patented June 5, 1962

3,038,134
MEANS FOR REDUCING THE HARMONIC CURRENTS IN A STATIC CONVERTER PLANT
Harry Forssell, Ludvika, Sweden, assignor to Allmanna Svenska Elektriska Aktiebolaget, Vasteras, Sweden, a corporation of Sweden
Filed Jan. 13, 1959, Ser. No. 786,603
Claims priority, application Sweden Jan. 18, 1958
4 Claims. (Cl. 333—79)

The present invention is related to the problem of reducing harmonic currents on the alternating current side of a static converter plant, which problem is solved by means of an arrangement consisting of one or several shunt circuits comprising capacitive, inductive and resistive impedances, connected to the alternating current side of the plant.

A static converter connected to an alternating current network always causes a deformation of the current on the alternating current side. This current has, in principle, a step-like progress following a sine curve. The number of steps per cycle depends on the number of alternative current paths in the converter. An analysis of the content of harmonics in the step curve shows that only harmonics of ordinal $n = k.p \pm 1$ will arise; $k$ being a positive number and $p$ the pulse number of the converter.

In practice the above mentioned step curve deviates from the theoretical one, partly due to the fact that the direct current cannot be kept entirely constant even if a large inductance is connected to the direct current side, and partly because the commutation between the different current paths on the alternating current side is not momentary but requires a certain time "the overlap time." This deformation of the step curve does not introduce any new harmonics but causes the harmonics of higher ordinal to be considerably reduced compared to the theoretical ones.

The static converter will consequently operate as a generator of harmonic currents which are impressed on the alternating current network. The nature of this network has no substantial influence on the generation of harmonic currents. In certain cases these harmonic currents can cause great inconvenience if they are not suppressed, for instance, due to the disturbance they may cause in telephonic communication or due to the resonant currents of considerable magnitude which may arise in the alternating current network connected to the converter plant.

It has been proved that the most suitable way of suppressing the current harmonics is to connect one or several shunt circuits to the alternating current side. As the converter plants under consideration, operate with high or very high effect, special points of view, especially economic ones, with regard to the nature of the shunt circuits, are added to those caused by the fact that the circuits are used as a filter. The losses in the circuits are for instance of very great importance both in view of the cost of the components used and the energy.

Several requirements may be listed for a shunt circuit of the considered type;

The shunt circuits should have as large an impedance as possible for the fundamental current, but the impedance for the harmonics should be as low as possible. The resistive component of the impedance should be as large as possible compared with the reactive component. The inductive part of the reactive component cannot be allowed to be too large but the capacitive part may have a moderate value. The reason for this is that the converter is capable of absorbing a certain inductive load and that it may be desirable to compensate this at least partly, which may be done by means of the capacitive part of the reactive component.

Among other facts which should be noticed it may be mentioned that it must be taken into consideration that the admittance of the network is not always known. During different service and load conditions this admittance can be quite different. This means that the impedance of the shunt circuit has to be substantially resistive. If the susceptance of the network should temporarily have the same value as the susceptance of the shunt circuit but with opposite sign, large resonant currents would arise between the shunt circuit and the network, unless the sum of the conductance of the shunt circuit and the network is smaller than the above mentioned susceptance. The harmonic current in the network becomes small in relation to the harmonic current produced by the static converter to the extent that this conductance is small compared with said susceptance.

If the requirements for said shunt circuit are summed up it may be said that the shunt circuit shall have as high an impedance as possible for the fundamental but shall have as low an impedance as possible for the harmonic. The resistive component shall be larger than the reactive component for the characteristic harmonics.

A shunt circuit which fulfils the above mentioned requirements is shown in principle in FIGURE 1. A static converter 1 is connected to two direct current conductors 2, 3 and to two alternating current conductors 4, 5. A shunt circuit is connected between the last mentioned conductors and consists of a capacitor 6 in series with two parallel branches, one of which comprises a capacitor 7 in series with a resistor 8 and the other comprises an inductor 9. In the FIGURE the capacitance of the capacitors 6, 7 is designated by C and the inductance of the inductor 9 by L. The resistance R of the resistor 8 is expressed in L and C.

From the expression for the impedance Z of the shunt circuit, the impedance as well as its imaginary portion X and its real portion R may be drawn in a diagram, as shown in FIGURE 2. The frequency value $\omega\sqrt{LC}$ is set off along the X-axis and the impedance $$Z\sqrt{\frac{C}{L}}$$

along the Y-axis.

If a plant comprises a six pulse connected static converter it has such a character that the two lowest harmonics, the fifth and the seventh will dominate. The shunt circuit can certainly be given such values for L and C that according to the impedance character in FIGURE 2, the above mentioned requirements are fulfilled, but for a certain limited capacitance for the fundamental the impedance for the fifth and the seventh harmonic does not become as low as desired. If the fifth harmonic, as shown in FIGURE 2, is located at the value 0.8 on the X-axis, the above mentioned condition is still fulfilled but thereby the position of all other harmonics in the diagram is already determined and the seventh harmonic falls on the value 1.13 and the fundamental on the value 0.16. The permissible value of the impedance for the fundamental consequently also determines the values of the impedances for the fifth and the seventh harmonics and the losses in the shunt circuit. If it is assumed that a reasonable value of the impedance for the fundamental corresponds to a reactive effect which is equal to one half of the rated effect of the converter it appears that the impedances for the fifth and the seventh harmonic become too large. Consequently this shunt circuit does not fulfill the requirement with regard to a low impedance with a predominant resistive character, also for the fifth and seventh harmonic.

In order to meet these more rigorous requirements a more complicated shunt circuit must be used, and according to the present invention the requirements are fulfilled by one or several shunt circuits, which have a power loss with regard to the fundamental which is negligible compared with the rated power of the static converter, less than 1%, and which have an impedance frequency characteristic with pronounced minima in the proximity of at least the two lowest characteristic harmonics in the plant and an impedance which is low for all other characteristic harmonics in the plant.

Figure 4:
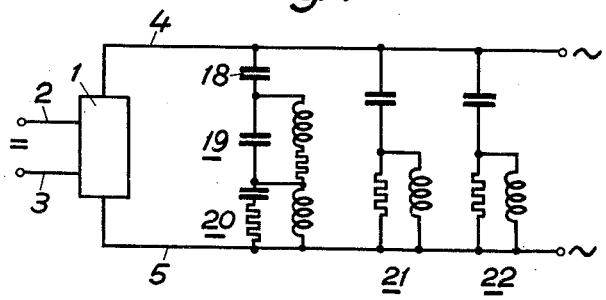
Figure 5:
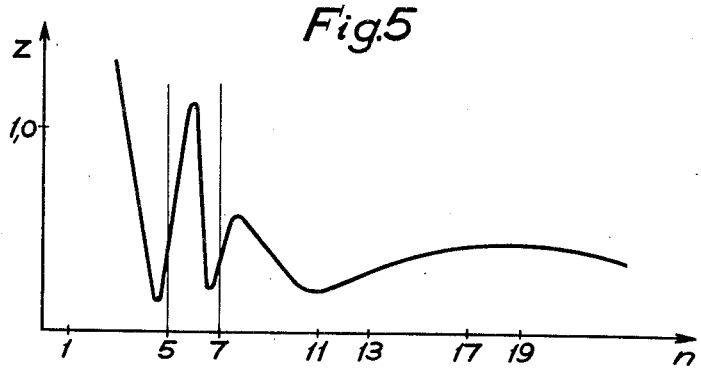

On the enclosed drawing FIGURES 3 and 4 show two forms of the invention and FIGURE 5 shows the impedance frequency characteristic of these forms.

In addition to the already mentioned components 1-5, the arrangement of FIGURE 3 consists of two parallel shunt circuits, one of which, 10, is a series resonant circuit and the other, 11, is a circuit of the same type as the one described in connection with FIGURE 1. The first mentioned shunt circuit comprises a capacitor 12 and an inductor 13 in series with a circuit consisting of two parallel branches, one of which comprises a capacitor 14 in series with a resistor 15 and the other, an inductor 16 in series with a resistor 17. This shunt circuit operates as two parallel connected resonant circuits one of which may be tuned for the fifth harmonic and the other for the seventh harmonic. The resistors 15 and 17 guarantee that the resistance of the shunt circuit dominates in the proximity of the fifth and the seventh harmonic.

The other shunt circuit 11 has the object to divert harmonic currents of the eleventh and higher ordinals. This shunt circuit comprises, as already mentioned, the same circuit components as the shunt circuit in FIGURE 1, but the designation numbers 6-9 are provided with indexes in order to show that the components do not necessarily have the same dimensions as the components in FIGURE 1. The shunt circuit 11 shall be so dimensioned that the impedance for the higher characteristic harmonics is low.

FIGURE 5 shows an impedance frequency diagram for a circuit according to FIGURE 3, where the ordinals for the harmonics are set off upon the X-axis. This diagram shows that the resulting shunt circuit has sharp impedance minima for the fifth and the seventh harmonics. It is not shown in FIGURE 5, but it is evident that the distribution between R and X for harmonics of higher ordinal than the eleventh is the same as in FIGURE 2.

The alternating current networks connected to a static converter plant are generally inductive in the case of six pulse connected converters within the frequency range up to and including the seventh harmonic. In order to avoid resonance between the network and the shunt circuit it is therefore advantageous to make the shunt circuit somewhat inductive for harmonics under the seventh. In FIGURE 5 this is indicated in that the minima for the fifth and seventh harmonics are deliberately located somewhat to the left of the harmonics so that the upward, inductive branches of the impedance curve pass through the harmonics.

One form of the invention with three shunt circuits is shown in FIGURE 4. The shunt circuit to the left, which comprises a capacitor 18 in series with two parallel resonant circuits 19 and 20, diverts harmonic currents of the fifth and seventh ordinals. The two shunt circuits 21 and 22 to the right, which each consist of a series resonant circuit in which an inductance is shunted by a resistor, divert harmonic currents of higher ordinals. This connection has, just as the connection according to FIGURE 3, an impedance frequency characteristic of substantially the same type as the one shown in FIGURE 5.

The shunt circuit described above can be connected to a star connection or a delta connection as it is assumed that the alternating current network is a three-phase network. For the sake of clarity the FIGURES 1, 3 and 4 show one-phase alternating current networks but it is evident that in the case of a three-phase network three separate shunt circuits of the type shown must be connected to the network.

An additional advantage of the invention becomes obvious when a static converter operating as inverter consists of two phase displaced six-pulse connected constituent converters which together form a twelve-pulse system. In such converters, which operate in parallel on the alternating current side on a common network, there is the risk that they mutually disturb each other's communication or especially intrude on each other's communication margins. This can be avoided by means of a compensating reactor between the two six-pulse connected constituent converters, e.g. according to the patent (patent application Serial No. 712,241, now Patent No. 2,899,628). If, however, a sufficiently effective shunt circuit is arranged according to the present invention these disturbances disappear and the compensating reactor becomes unnecessary.

I claim:

1. Filter for a static converter plant connecting an A.C. and a D.C. network for reducing the current harmonics on the A.C. side of said converter plant, said filter being connected on the A.C. side of said converter plant; said filter comprising capacitive, inductive and resistive elements forming filter means; said filter means comprising a first filter means having distinct minimum impedance in the proximity of at least the two lowest of said current harmonics and a second filter means having a low impedance at the remaining current harmonics in the plant in relation to the impedance of the network, the resulting impedance of said filter being so great at the fundamental frequency of the alternating current that the power dissipation of said filter is negligible compared with the rated power of the plant and having a resistive component which is larger than the reactive component at frequencies in the proximity of all the characteristic current harmonics in the plant; said capacitive, inductive and resistive elements of said filter means forming parallel current paths connecting the A.C. conductors of said converter plant; all said current paths going through a capacitive element; said second filter means comprising two current paths one of which substantially consists of series connected capacitive and resistive components while the other substantially consists of series connected reactive components.

2. In a filter as claimed in claim 1, said first filter means comprising one current path tuned in the proximity of at least the two lowest of said current harmonics.

3. In a filter as claimed in claim 1, said first filter means comprising a current path corresponding to each of at least the two lowest of said current harmonics; each of said current paths of said first filter means being tuned in the proximity of the corresponding current harmonic.

4. In a filter as claimed in claim 1, the reactive component of the impedance of said first filter means being inductive for frequencies in the proximity of the two lowest current harmonics in the plant.

References Cited in the file of this patent

UNITED STATES PATENTS

| | | |
|---|---|---|
| 1,284,743 | Merwin et al. | Nov. 12, 1918 |
| 1,835,156 | Hazeltine | Dec. 8, 1931 |
| 1,961,140 | Farnham | June 5, 1934 |
| 1,998,325 | Lyman | Apr. 16, 1935 |
| 2,138,996 | Blumlein | Dec. 6, 1938 |
| 2,291,069 | Brown | July 28, 1942 |
| 2,917,699 | Grant | Dec. 15, 1959 |